(No Model.)

C. W. FORD.
TRUCK.

No. 277,699. Patented May 15, 1883.

Witnesses:
J. W. Reynolds Jr.
W. J. Osgood

Inventor.
Clayton W. Ford
by Howard A. Snow
Atty

UNITED STATES PATENT OFFICE.

CLAYTON W. FORD, OF FINDLAY, OHIO.

TRUCK.

SPECIFICATION forming part of Letters Patent No. 277,699, dated May 15, 1883.

Application filed November 27, 1882. (No model.)

*To all whom it may concern:*

Be it known that I, CLAYTON W. FORD, a citizen of the United States, residing at Findlay, in the county of Hancock and State of Ohio, have invented certain new and useful Improvements in Trucks, of which the following is a specification, reference being had therein to the accompanying drawings.

This invention relates to improvements in trucks for transporting and elevating grain or other articles in sacks or similar parcels onto wagon-drays or raised platforms, and has for its object a truck wherein the load is elevated by means of a combination and arrangement of levers.

It consists in the peculiar combination and arrangement of the levers and the adjustable canvas platform, as will be hereinafter described, and specifically pointed out in the claims.

Figure 1:
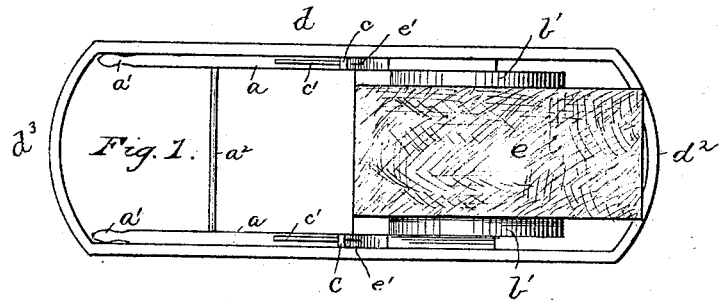
Figure 2:
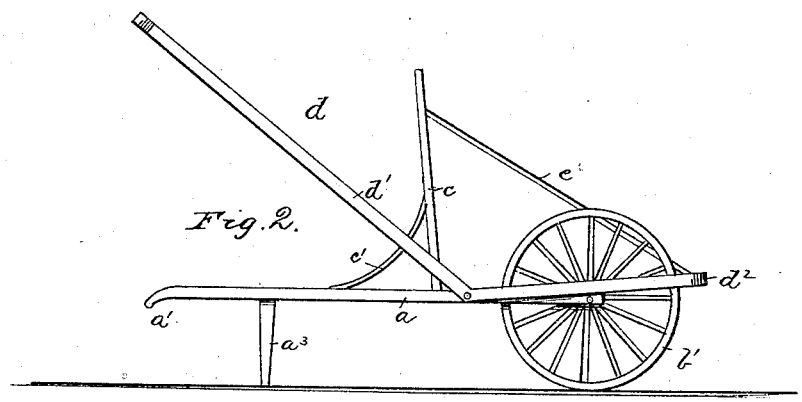
Figure 3:
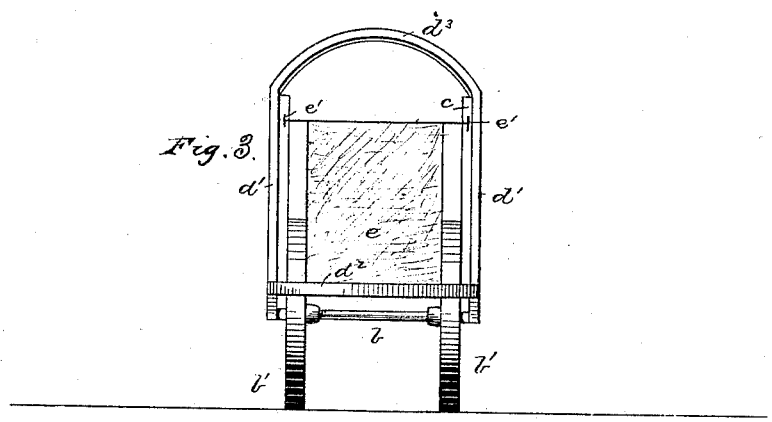

In the drawings, Figure 1 is a plan view, Fig. 2 is a side elevation, and Fig. 3 is a front elevation, of a truck constructed according to my invention.

$a\ a$ are the side bars of the truck-frame, and form one of the levers hereinafter described. They are journaled at their forward ends on the axle $b$, on which are spindled the wheels $b'$, and the axle is extended beyond the wheels on either side to provide stops for the short arm of the lever hereinafter described. The bars $a$ are constructed with handles $a'$, and are braced apart by the rod $a^2$.

$a^3$ are legs secured to the under side of bars $a$.

$c\ c$ are standards projected upward from the bars $a$ at a point in rear of the axle $b$, as shown. These standards are slightly inclined from a vertical line toward the handle and the bars $a$, as shown, and are braced in position by the stay-rods $c'$.

$d$ is the lever, composed of the side bars, $d'$, and the end or cross bars, $d^2\ d^3$, forming a frame, as shown. The side bars are arranged far enough apart to rest over the bars $a$, and are pivoted to the said bars at a point slightly in advance of the standards $c$. The bars $d'$ are bent at an obtuse angle at their pivotal point, approaching an L shape, the longer arm of the lever being extended to the rear, as shown, while the shorter arm extends forward over and in front of the wheels $b'$, the bars $d'$ being supported by the extended ends of the axle $b$.

$e$ is the adjustable canvas platform. Its lower end is secured to the front bar, $d^2$, of the lever, and it is pivoted at its upper end with a cross-bar, which is secured in staples $e'$, placed near the upper end of the standards.

In the operation of my truck, the same being in front of the filled sacks, the bars $a$ are raised until the end bar, $d^2$, of the lever $d$ can be pushed under the sack, when the latter is tilted back onto the canvas platform $e$. The bars $a$ are then brought into the position about as shown in Fig. 2, the extended ends of the axle swing as fulcra to raise the lever $d$, and the sack is then conveyed to the wagon or dray on which it is to be loaded. The end $d^3$ of lever $d$ is then depressed to the ground, raising the sack-carrying platform $e$, the upper end of which is made fast to the standards $c$, as described. Then if the sack is not raised high enough the handles $a'$ are raised, the bar $d^3$ being still held to the ground. This raises the sack higher and gives the platform a throw forward, which aids to deliver the sack onto the dray or wagon.

What I claim is—

1. The combination, substantially as described, of the truck-frame, the lever pivoted thereto and bent at an angle, as described, and the canvas platform secured to the forward end of the lever and to the standards $c$, all arranged and operating as and for the purposes specified.

2. The combination, as set forth, of the truck-frame, the standards $c$, projected upward from the side bars of said frame, the lever $d$, and the canvas platform secured at its lower end to the lever, and having its upper end made fast to the standards $c$.

3. The truck, substantially as shown and described, consisting of the side bars, $a\ a$, axle $b$, wheels $b'$, standards $c$, lever $d$, and canvas platform $e$, as set forth.

In testimony whereof I affix my signature in presence of two witnesses.

CLAYTON W. FORD.

Witnesses:
CYRUS GRUBB,
D. B. BEARDSLEY.